Patented Sept. 8, 1936

2,053,562

UNITED STATES PATENT OFFICE 2,053,562

PROCESS FOR GROUTING CRACKS AND CONTRACTION JOINTS

Lars R. Jorgensen, Berkeley, Calif.

No Drawing. Application April 27, 1935, Serial No. 18,624

9 Claims. (Cl. 72—106)

For grouting contraction joints or cracks in dams or other material, buildings, arches or cracks and pores in sandstone or other rock, it may be expedient to use a system of grout pipes as is in common use, but instead of employing plain cement grout I propose to use a grout consisting principally of a mixture of Portland cement and plaster of Paris, or Portland cement, plaster of Paris and pumicite or celite or a like product.

The plaster of Paris grout alone expands in volume about three-tenths ($\frac{3}{10}\%$) per cent, when setting. Portland cement grout alone contracts when setting, but by mixing the two together a combination can be obtained, which is about neutral in this respect and this is one feature which is taken advantage of in this invention. The relative proportion of the mix may vary from mostly Portland cement to mostly or all plaster of Paris.

The combination is much more plastic than Portland cement alone and the modulus of elasticity, if any, of the combination is much lower than that of Portland cement grout.

These two features are important in ordinary building construction, but are especially important in arch dam construction for filling the artificial cracks left between the individual blocks or voissoirs after the concrete or masonry has set and contracted.

These joints, artificial or otherwise, generally open up a maximum during the month of March, in the Northern Hemisphere and this is therefore the proper time to fill these openings with grout.

When an arch or arch dam is loaded the stresses are not uniformly distributed across the section. This stress distribution will however be made more uniform after the injection of my improved grout mixture in the contraction joints and this is also a feature of my invention.

This grout mixture is very plastic after setting and therefore "gives" considerably when the load comes on, at places of greater unit compression and "flows" to places of less compression, thereby tending to equalize the stresses across the section at every joint, which in turn influences advantageously the stress distribution in the whole block between two joints.

As a general rule a smaller amount of mixing water makes a better grout than otherwise. Consideration has however to be given to the time it takes for the mixed grout to reach its ultimate place of deposit, as this time must be shorter than the setting time. The setting time can be harmlessly extended to a large extent by the addition to the mixing water of various substances, such as sugar, molasses etc., or other setting retarder, in predetermined quantities. The action of setting and ultimate hardening is approximately as follows: The plaster of Paris crystallizes faster than the Portland cement hydrates and has the tendency to rob the Portland cement of the water necessary for its complete hydration so that a mixture more plastic than elastic results.

Some time after the water in the reservoir has wetted the upstream face of the dam, water will be available by means of capillary action for the Portland cement to take up the amount it lacked for complete hydration and the grout will then become harder and more elastic. This happens mainly after the grout has undergone the squeeze that made it flow from areas of high compression towards areas of low compression or tension.

In some cases a decomposition of the grout material may take place some time after the dam has been in use, due to the sulphate composition of the plaster of Paris in the presence of moisture. This will be accompanied by a slight expansion, which is advantageous. The contraction joint ought to be provided with grout stops along both the upstream and downstream face and with recesses on the faces of the contraction joints, so as to keep all the grout material in the joint.

In order that the Portland cement may take a considerable part in the initial hardening process of the grout, it is sometimes desirable to mix the Portland cement grout first and some time later mix the plaster of Paris grout and then quickly mix the two grouts in the correct proportion just before this mixture is conveyed by the grout pump, gravity or by other suitable means to its final place of deposit.

In order to better prepare the sides of contraction joints or the cracks in dams, buildings, arches and other construction, or cracks in rock and other material, for the reception of grout, it is often desirable to inject into the joints, cracks or voids a mixture consisting of diluted sodium silicate and diluted calcium chloride, or diluted sodium silicate in combination with any diluted chemical capable of forming a gel with the sodium silicate. If desirable, most of the gel can be emptied out again by means of compressed air or the like.

This process will leave a wet slippery skin on the side walls, where the separation of these walls is considerable, and it will fill the cracks where these are so fine that no grout can penetrate.

The grout is then injected in some usual manner. This grout may consist of ordinary Portland cement grout or a mixture of Portland cement and plaster of Paris as described above. The mixing fluid for this grout may be either plain water or a diluted gel formed by mixing diluted sodium silicate with a diluted chemical capable of forming a diluted gel with the sodium silicate. This diluted gel mixing water will allow a drier grout to be used since it makes the grout easier flowing and more capable of penetrating fine cracks. Such grout also has but small volume change.

Where cracks are difficult to close watertight, some surplus of sodium silicate may be left in the gel mixing water. After the grout has been injected, carbon dioxide gas under pressure is admitted. This gas will then combine with the surplus sodium silicate and close up permanently any small cracks left. Any gas which will react with the sodium silicate to set silica free may be used.

For cracks and voids in sandstone, or other rock, in places where there are no waterstops provided, a plain cement grout may be used to advantage in combination with a gel in the mixing water, since the presence of the gel makes it possible to get more grout into the openings to be closed up, than it would be without the gel. The resulting shrinkage is also less mainly due to the drier workable mix that can be used.

In general the chemicals or the fluid grout is pumped or otherwise forced into conduits built into the new structure, or the conduits may be introduced into existing structures.

Celite is a diatomaceous earth product.

While I have referred to various details, yet these may be changed without departing from the spirit of my invention, the scope of which is defined in the appended claims.

Having thus described my invention, what I claim and desire to secure by Letters Patent is:—

1. A process of filling and solidifying the open space in contraction joints or other voids which comprises injecting into said void a gel in solution and then injecting sufficient grout mixture so that the void will be filled, said grout mixture possessing great plasticity when first set and developing practically no change in volume while setting, said grout mixture containing a setting retarder.

2. A process of filling and solidifying the open space in a contraction joint in structures or a crack in rock or the like which comprises injecting into the joint or crack a gel in solution and then injecting a fluid grout of a calcium sulphate-like cement, Portland cement and water, the time of setting of said grout being delayed by preparing the Portland cement part of the grout some time in advance of mixing the calcium sulphate-like cement grout therewith, the grout being in such an amount that the void will be filled.

3. A process of filling and solidifying the open space in contraction joints in structures, voids in rock, or the like which comprises injecting into the joint, crack, or void a gel in solution and then a sufficient quantity of a plaster of Paris and Portland cement grout containing a setting retarder so that the empty space will be filled.

4. A process of filling and solidifying the open spaces in contraction joints, or other open voids or cracks which comprises injecting a gel in solution, removing most of it, and then injecting such a quantity of a plaster of Paris and Portland cement grout containing a setting retarder that the space will be filled.

5. A process of filling and solidifying the open spaces in contraction joints, cracks in rocks and voids in loose material, or the like, which comprises injecting into the voids or cracks a gel, thereafter injecting a grout having a gel in the mixing water, the amount of said grout being so great that the entire open space is filled.

6. A process of filling and solidifying the open spaces in contraction joints or other open joints or cavities which comprises wetting the sides of the joints or cavities with a sodium silicate solution and then injecting a plaster of Paris-Portland cement grout, water of which contains calcium chloride dissolved therein and a setting retarder, the amount of said grout being so great that the entire open space is filled.

7. A process of filling and solidifying the open spaces in contraction joints or other open joints or spaces by wetting the sides of the joints or spaces with a diluted sodium silicate solution followed by the injection of a plaster of Paris and Portland cement grout, the water of said grout containing chemicals capable of combining with the grout and with the sodium silicate, the mixing water also containing a setting retarder, said grout filling the entire open space.

8. A process of filling and solidifying the open spaces in contraction joints or other voids by wetting the sides of the joints with a sodium silicate solution, followed by the injection of a plaster of Paris-Portland cement grout having a setting retarder in the mixing water, and this again followed by the injection of a carbon dioxide gas, the amount of grout being such that the entire open spaces are filled.

9. A process of filling and solidifying the open spaces in contraction joints or other voids by wetting the sides of the joints with a sodium silicate solution, followed by the injection of a plaster of Paris-Portland cement grout, and this again followed by the injection of a gas capable of forming a gel with the sodium silicate, the amount of grout being such that the entire open spaces are filled.

LARS R. JORGENSEN.